No. 657,419. Patented Sept. 4, 1900.
W. JÄGER.
MACHINE FOR DISTRIBUTING MANURE.
(Application filed June 22, 1899.)

(No Model.) 3 Sheets—Sheet 1.

Witnesses
J. Green
N. P. Hammond

Inventor:
Wilhelm Jäger
By ____
attys

No. 657,419. Patented Sept. 4, 1900.
W. JÄGER.
MACHINE FOR DISTRIBUTING MANURE.
(Application filed June 22, 1899.)

(No Model.) 3 Sheets—Sheet 2.

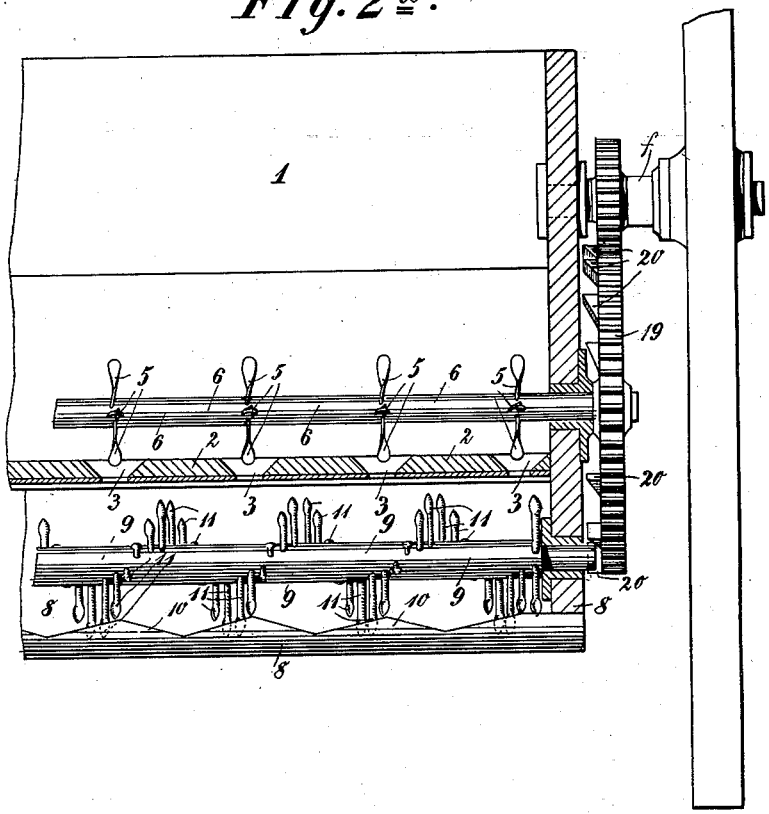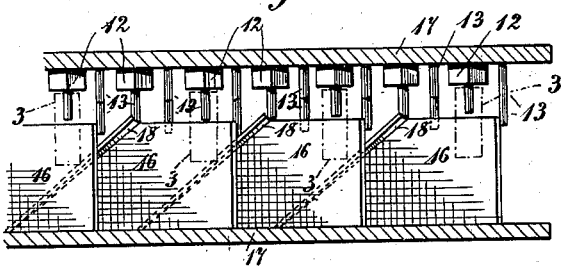

UNITED STATES PATENT OFFICE.

WILHELM JÄGER, OF KÖNKENDORF, GERMANY.

MACHINE FOR DISTRIBUTING MANURE.

SPECIFICATION forming part of Letters Patent No. 657,419, dated September 4, 1900.

Application filed June 22, 1899. Serial No. 721,441. (No model.)

*To all whom it may concern:*

Be it known that I, WILHELM JÄGER, a subject of the King of Prussia, German Emperor, residing at Könkendorf, near Pritzwalk, in the Kingdom of Prussia, Germany, have invented certain new and useful Improvements in Machines for Strewing Manure and other Fertilizers, (for which I have applied for patents in Germany, dated March 25, 1899, and in France, dated May 20, 1899,) of which the following is a specification.

This invention relates to machines for strewing fertilizers and like materials, hereinafter referred to as "manure."

The object of the invention is to produce uniform distribution of the manure.

Figure 1:
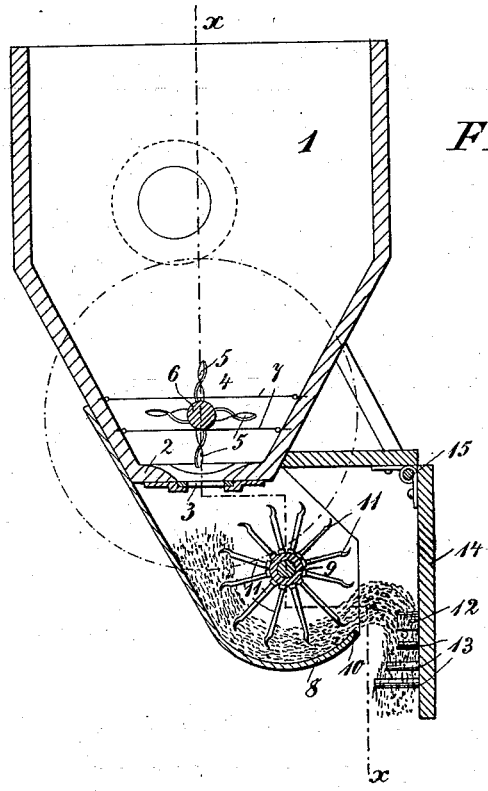
Figure 4:
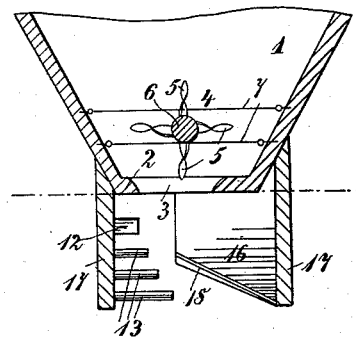
Figure 2:
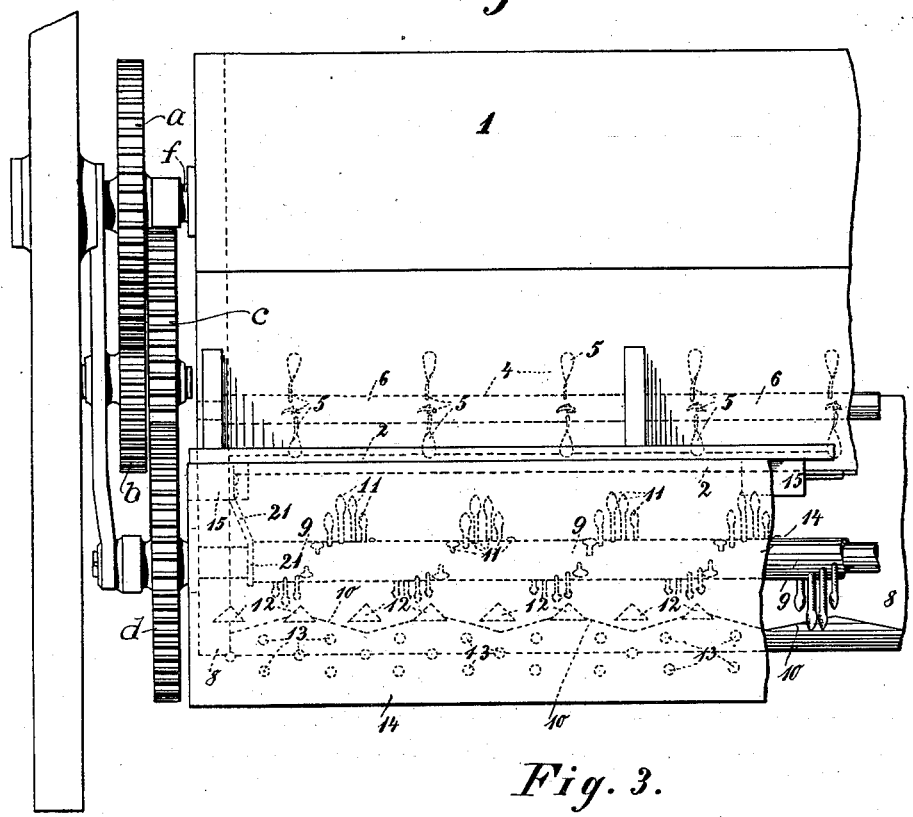
Figure 3:
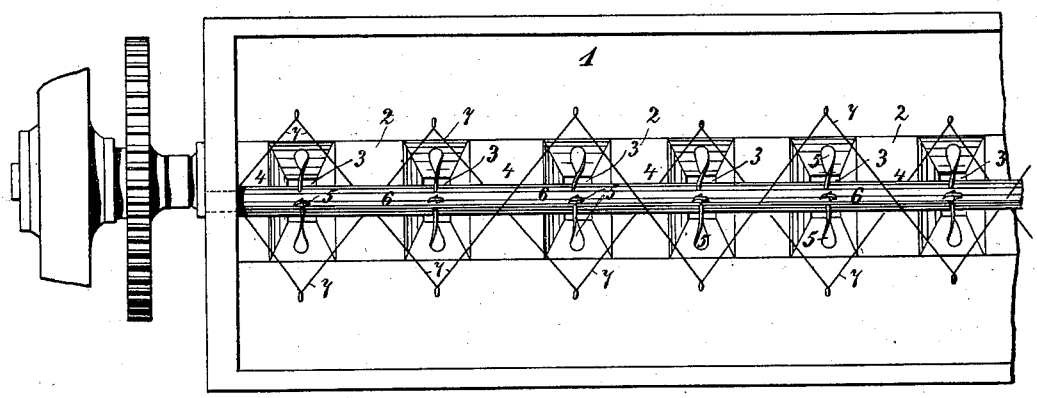

Figure 1 shows a vertical section. Fig. 2 is a partial plan, and Fig. 2ª is a partial section on the line X X of Fig. 1; Fig. 3, a plan of Fig. 2. Fig. 4 shows another construction of strewing-machine in vertical section, and Fig. 5 is a plan of the same.

The dividing apparatus, which is designed for the purpose of regulating the passage of the manure out of the boxes 1, consists of a distributing-board 2, having an adjustable slide 2ª, corresponding holes 3, Fig. 2, being formed in the board 2 and slides 2ª, through which the manure is conducted regularly as possible, as by the agitators J. In order to avoid the manure being formed into a smooth roller by the agitator, owing to its sticky nature, in which condition it would be useless, it is sufficient to provide the agitator with as few arms as possible, wide apart, and to arrange a wire or wires 7 across the boxes between each set of arms 5 5 of the agitator and inclined to the axle 6, which will prevent the formation of a roller by the agitator, as it prevents any part of the manure between the blades from rotating with the agitator. Instead of the wires 7 rods can be placed either partially or quite across the box. The inclined position of the rods or of the wire with regard to the axle 6 is essential, as it enables the manure to slide along these wires or rods and facilitates the task of the blades 6, which advance the manure to the outlet-openings 3. The shaft is driven by gearing 19 20 from the principal axle of the machine. In the same manner as the advance of the manure in the boxes to the holes 3 of the distributing-board is accompanied with difficulty so, also, is the distribution thereof among the holes before it falls through. In the corn-sowing machines a system of inclined boards and pins is sufficient upon which the grain falls from the side. This process can only be utilized for manure when it has been somewhat divided, so that it cannot become fixed in large lumps between the rods.

A strewing-trough 8 and star-roller 9 are arranged beneath the distributing-board 2 of the box 1, which is intended for dividing the material to be strewed for the strewing device below, Fig. 1. The trough 8 is further designed for the purpose of equalizing unequalness which must always arise upon a not quite homogeneous mass passing through the holes of the sieve by allowing a momentary heap to be piled up when the feed of the manure is temporarily increased without a greater quantity being strewn, whereas upon the feed temporarily decreasing this piled-up manure is ejected. Finally, the strewing-trough 8 is excellently suited for laterally distributing the manure falling through the holes 3 of the distributing-board 2 up to the next hole when provided with angular or round projections at the edge, Fig. 2, the highest points of which are beneath the holes 3 of the distributing-board and gradually lower in the intermediate spaces, for inasmuch as otherwise conical heaps would be formed under the holes 3 and the manure would rise higher than in the intermediate spaces the edge 10 of the trough 8 must be lower at these intermediate spaces than below the holes 3 if equal quantities of manure are to be ejected at all times. It is indeed clear that for a definite quantity of manure of a definite quality a regular strewing can be assured by the toothed form of the edge 10 of the trough 8 alone; but this is not sufficient if any desired quantity of every kind of manure is to be evenly strewn by means of the trough 8. With this object the spoon-like arms 11 of the star-roller 9, rotating in the trough 8, must be of different lengths, so that a greater number of arms project into the manure and displace it by reason of their spiral arrangement according as the manure is piled up to a greater height beneath the holes of the distributing-board 2—that is, according as the feed is stronger or the less it can be sideward displaced in consequence of its sticky nature. The shortest arms can be arranged to form a perfect spiral. The axle or roller 9 is driven through gearing *a b c d* from the principal axle *f* of the machine. The shaft or roller 9 is intermittently reciprocated in the direction of its axis, whereby the stopping of the device by sticky manure is prevented. In this manner the blades are prevented from cutting circular ridges in the sticky manure without advancing it.

The reciprocating motion of the strewing-roller is obtained by arranging a number of projections 20 on the side of the spur-wheel 19 on the right end of the axle 6, which move the roller 9 toward the left under the tension of the spring 21, so that after each displacement it returns of itself into position. It is also of advantage to so construct the angular or rounded edge of the trough 8, Fig. 2ª, that it comes into contact with the arms of the roller 9 and is brought into vibration, by which means the formation of heaps in the trough beneath the holes 3 is avoided and the manure is moved by the arms to the lower intermediate places; but even with these improvements of the trough 8 and roller 9 an absolutely-regular distribution of the manure is not assured in every case. No injury is done by allowing the manure to also pass the strewing device above mentioned, which in corn-sowing machines is connected with the dividing device and consists, essentially, of a system of wedge-like pieces 12 and rods 13, Fig. 1. The box, the back of which is formed by the board 14, to which the pieces 12 and rods 13 are fastened, serves as a screen against the wind, by which the manure would otherwise be driven aside. This screen or board 14, the pieces 12 and rod 13 of which are passed last of all by the manure, is arranged but a slight distance above the soil and is hinged to the box 1, so that it can yield when passing over unevennesses; but this screen cannot be suspended in front of the holes 3 of the sieve 2, so that the manure would glide down the front thereof when it bears against the ground, as in this manner the manure of inferior quality would remain on the front between the pieces 12 and rods 13, so as to entirely stop the passage. The screen must, therefore, whether provided with the pieces 12 and rods 13 or not, be suspended on hinges 15 behind the holes 3 of the sieve, so that when forced back it is only temporarily interrupted in its function, as its own weight causes it to immediately return to normal position.

The combination of the dividing device described with one of the previously-described strewing apparatus or with both and with the wind-screen arranged near to the surface of the soil movable and behind the holes of the sieve forms one whole, inasmuch as all the parts act complementary to each other for the purpose of strewing every kind of manure and any desired quantity of the same, although when the requirements are less one or the other of the improvements in question may be omitted. Some of these parts can also be replaced by other constructions acting according to the same principle and fulfilling the same purpose. For example, the trough and star-roller can be replaced by the system of shelves and pins used in corn-sowing machines, which could be arranged on the manure-strewer within the box-like wind-screen 17, which would in any case be necessary, Figs. 4 and 5. This screen 17 is fixed. Beneath the holes of the sieve the pieces 12 and rods 13 are arranged. A shelf 16 receives a part of the manure of the width of the distance between two holes. This shelf 16, which conducts the manure sidewise, also effects its distribution, the edge of the trough 8 having angular or round recesses in the spaces between the holes of the sieve 2, over which the manure falls in small quantities without any mechanical assistance.

The similarity of the shelf 16 compared with the strewing-trough constitutes the essential feature of the former.

What I claim, and desire to secure by Letters Patent of the United States, is—

1. A machine for distributing manure comprising a box provided with a distributing-board having holes for the exit of the manure, a trough beneath the said box or distributing-board, the edges of the trough being formed with projecting portions at the points beneath the holes in the distributing-board to effect a regular fall of the manure over the edge, notwithstanding the unevenness of the feed through the holes.

2. A machine for distributing manure comprising a box provided with a distributing-board having holes for the exit of the manure, a trough beneath the said box or distributing-board, the edges of the trough being formed with projecting portions at the points beneath the holes in the distributing-board to effect a regular fall of the manure over the edge, notwithstanding the unevenness of the feed through the holes, and a distributing-roller located beneath said distributing-board and provided with arms of different length, mechanism for rotating said roller and mechanism for imparting a reciprocating longitudinal movement to said roller.

In testimony whereof I have hereunto set my hand in the presence of two witnesses.

WILHELM JÄGER.

Witnesses:
 HENRY HASPER,
 WOLDEMAR HAUPT.